United States Patent
Sasaki (10) Patent No.: US 12,496,996 B2
(45) Date of Patent: Dec. 16, 2025

(54) GAS GENERATOR (71) Applicant: DAICEL CORPORATION, Osaka (JP)

(72) Inventor: Tomoya Sasaki, Tokyo (JP)

(73) Assignee: Daicel Corporation, Osaka (JP)

(*) Notice: Subject to any disclaimer, the term of this patent is extended or adjusted under 35 U.S.C. 154(b) by 0 days.

(21) Appl. No.: 18/608,009

(22) Filed: Mar. 18, 2024

(65) Prior Publication Data
US 2024/0217474 A1 Jul. 4, 2024

Related U.S. Application Data (63) Continuation of application No. PCT/JP2022/033023, filed on Sep. 1, 2022.

(30) Foreign Application Priority Data

Sep. 22, 2021 (JP) ................. 2021-154424

(51) Int. Cl.
B60R 21/264 (2006.01)
B60R 21/217 (2011.01)
(Continued)

(52) U.S. Cl.
CPC ...... *B60R 21/2644* (2013.01); *B60R 21/2171* (2013.01); *B60R 21/264* (2013.01);
(Continued)

(58) Field of Classification Search
CPC .............. B60R 21/264; B60R 21/2171; B60R 21/2644; F42B 3/04
(Continued)

(56) References Cited

U.S. PATENT DOCUMENTS 10,953,842 B2* 3/2021 Imai ................... B60R 21/2646
11,046,283 B2* 6/2021 Ramp ................ B60R 21/2644
(Continued)

FOREIGN PATENT DOCUMENTS

EP 4166228 A1 4/2023
EP 4309778 A1 1/2024
(Continued)

OTHER PUBLICATIONS

Translation of JP 2019214359 A (Year: 2012).*
(Continued)

*Primary Examiner* — James S Bergin
(74) *Attorney, Agent, or Firm* — WHDA, LLP (57) ABSTRACT A gas generator includes an igniter assembly configured to release the combustion product and including an igniter body, the igniter body including an igniter cup ruptured by a combustion product and an electro-conductive pin that supplies a current, a collar portion holding the igniter body, and a holding portion interposed between the igniter body and the collar portion, a housing including a combustion chamber accommodating a gas generating agent, and including a gas discharge port through which a combustion gas is discharged, and an elastic member being disposed between the igniter assembly and the gas generating agent with an axial direction of the elastic member being in a direction same as a direction of the housing, the elastic member including a regulation portion at an inner periphery thereof, the regulation portion being configured to regulate a direction in which the igniter cup ruptured expands.

19 Claims, 8 Drawing Sheets (51) Int. Cl.
*F42B 3/04* (2006.01)
*B60R 21/26* (2011.01)

(52) U.S. Cl.
CPC ........ *F42B 3/04* (2013.01); *B60R 2021/2177* (2013.01); *B60R 2021/26011* (2013.01); *B60R 2021/26029* (2013.01)

(58) Field of Classification Search
USPC ........................................................ 102/530
See application file for complete search history.

(56) References Cited

U.S. PATENT DOCUMENTS

| | | | |
|---|---|---|---|
| 12,060,031 B2* | 8/2024 | Inoue | B01J 7/00 |
| 12,214,741 B2* | 2/2025 | Shimizu | C06D 5/00 |
| 2016/0167618 A1* | 6/2016 | Jordan | F42B 3/04 |
| | | | 280/741 |
| 2019/0047508 A1* | 2/2019 | Esau | F42B 3/04 |
| 2019/0077360 A1 | 3/2019 | Imai et al. | |
| 2024/0351549 A1* | 10/2024 | Takahashi | B60R 21/264 |

FOREIGN PATENT DOCUMENTS

| | | | |
|---|---|---|---|
| JP | 2017-007456 A | 1/2017 | |
| JP | 2019214359 A * | 12/2019 | ........... B60R 21/201 |

OTHER PUBLICATIONS

International Search Report dated Nov. 8, 2022, issued in counterpart Application No. PCT/JP2022/033023. (5 pages).

Written Opinion dated Nov. 8, 2022, issued in counterpart Application No. PCT/JP2022/033023, with English Translation. (6 pages).

Extended (supplementary) European Search Report dated Aug. 5, 2025, issued in counterpart EP Application No. 22872671.7 (10 pages).

* cited by examiner

GAS GENERATOR

TECHNICAL FIELD

The present invention relates to a gas generator.

BACKGROUND ART

A gas generator including a long substantially cylindrical housing; a holder fitted to one opening end of the housing, and a closing member fitted to the other end part of the housing to close the other opening end of the housing has been proposed (for example, Patent Document 1). In the present technique, an igniter as an ignition mechanism of a gas generating agent is disposed at one axial end part of the housing. A coil spring includes a large diameter part which is densely wound spirally along an inner wall of the housing, and a decreased diameter part which is sparsely wound at a predetermined interval. The coil spring is provided to apply an elastic force to the gas generating agent while one end part is in contact with the holder and the other end part is in contact with at least a part of a periphery of a through hole on one end side of the gas generating agent.

CITATION LIST

Patent Document

Patent Document 1: JP 2017-7456 A

SUMMARY OF INVENTION

Technical Problem

According to the above-described technique, it is possible to fix a gas generating agent by applying the elastic force to the gas generating agent with a coil spring. On the other hand, when the interval between the igniter and the gas generating agent is widened with the coil spring, there is a risk that the direction in which the combustion product generated by the igniter is released is diffused and does not efficiently reach the gas generating agent. That is, for example, when the combustion product released by the igniter spread, a part thereof collides with an inner wall of the housing.

An object of the technique of the present disclosure is to improve ignition performance of a gas generating agent in a gas generator.

Solution to Problem (Aspect 1)

A gas generator according to the present disclosure includes: an igniter assembly including an igniter body accommodating an ignition charge, the igniter body including an igniter cup ruptured by a combustion product generated by combustion of the ignition charge and an electro-conductive pin that supplies a current for igniting the ignition charge, a collar portion holding the igniter body, and a holding portion interposed between the igniter body and the collar portion and configured to fix the igniter body to the collar portion, the igniter assembly being configured to release the combustion product; a housing having a tubular shape, the housing including a combustion chamber accommodating a gas generating agent, and including a gas discharge port through which a combustion gas generated by combustion of the gas generating agent is discharged; and an elastic member having a tubular shape, the elastic member being disposed between the igniter assembly and the gas generating agent in the housing with an axial direction of the elastic member being in an axial direction of the housing, the elastic member including a regulation portion at an inner periphery thereof, the regulation portion being configured to regulate a direction in which the igniter cup ruptured expands.

In this manner, the direction in which the igniter cup expands is regulated by the regulation portion, and the direction in which the combustion product is released during the operation of the igniter body is guided by the igniter cup having expanded. That is, since the direction in which the combustion product is released can be controlled toward the gas generating agent, the ignition performance of the gas generating agent can be improved in the gas generator.

(Aspect 2)

In Aspect 1, the igniter cup may include an expansion expected part formed in a rupture surface facing the combustion chamber, the expansion expected part including a peripheral edge a part of which is defined by a notch guiding a position of the igniter cup to be fractured, and the expansion expected part being configured to expand in a state where another part of the peripheral edge is connected to the igniter cup at a time of combustion of the ignition charge, and the regulation portion may be provided at a position in contact with the expansion expected part having expanded. Specifically, such a configuration can be adopted.

(Aspect 3)

In Aspect 1 or 2, the regulation portion may be a decreased diameter part where an inner diameter of the elastic member is smallest.

(Aspect 4)

In Aspect 3, the elastic member may decrease in diameter from a side of the igniter assembly toward the decreased diameter part. Specifically, the regulation portion can be formed by such a configuration.

(Aspect 5)

In Aspect 3 or 4, the elastic member may increase in diameter from the decreased diameter part toward the other end side of the housing. In this manner, the combustion product can be diffused at a desired angle from the decreased diameter part toward the gas generating agent.

(Aspect 6)

In any of Aspects 1 to 5, a side of the igniter assembly in the elastic member may be fitted to the collar portion or the holding portion. Specifically, the elastic member can thus be connected to the gas generator.

(Aspect 7)

In any of Aspects 1 to 6, the elastic member may have a lower elastic modulus on a side of the gas generating agent than on a side of the igniter assembly with respect to the regulation portion as a reference. In this manner, since the distance from the igniter assembly connected to the one end side of the housing to the regulation portion hardly changes, the regulation portion can be disposed at a position designed in advance with respect to the igniter assembly.

(Aspect 8)

In any of Aspects 1 to 7, the elastic member may be a coil spring. Specifically, such a configuration can be adopted.

(Aspect 9)

The elastic member may include, at an end part on a side of the gas generating agent, a penetration part having a size that allows the combustion product to pass therethrough and does not allow the gas generating agent to pass therethrough, and may apply the gas generating agent to an opposite side of the igniter assembly. In this manner, the elastic member becomes possible to allow the combustion product of the igniter body to pass therethrough and hold the gas generating agent on the combustion chamber side without passing it therethrough.

The content described in Solution to Problem can be combined as much as possible without departing from the problems and technical ideas of the present disclosure.

Advantageous Effects of Invention

According to the present disclosure, it is possible to improve ignition performance of a gas generating agent in a gas generator.

DESCRIPTION OF EMBODIMENTS

Embodiments according to the present disclosure will be described below with reference to the accompanying drawings. It should be noted that the respective configurations and the combinations thereof in the respective embodiments are only examples, and the configurations may be added, omitted, substituted, or otherwise modified as appropriate within a scope that does not depart from the spirit of the present disclosure. The present disclosure is not limited by the embodiments and is limited only by the claims.

Embodiment

Figure 1:
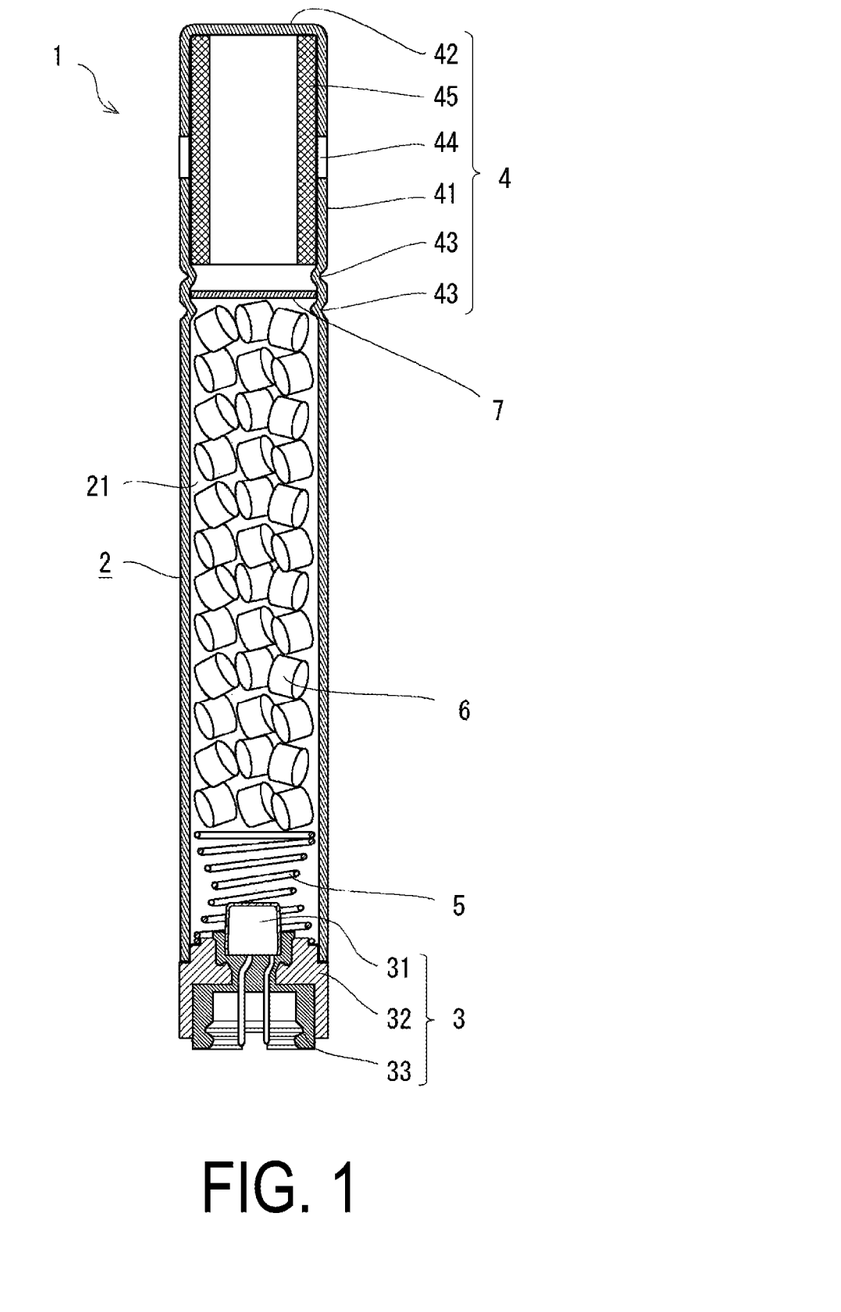
FIG. 1 is a schematic axial cross-sectional view illustrating an example of a gas generator.
Figure 2:
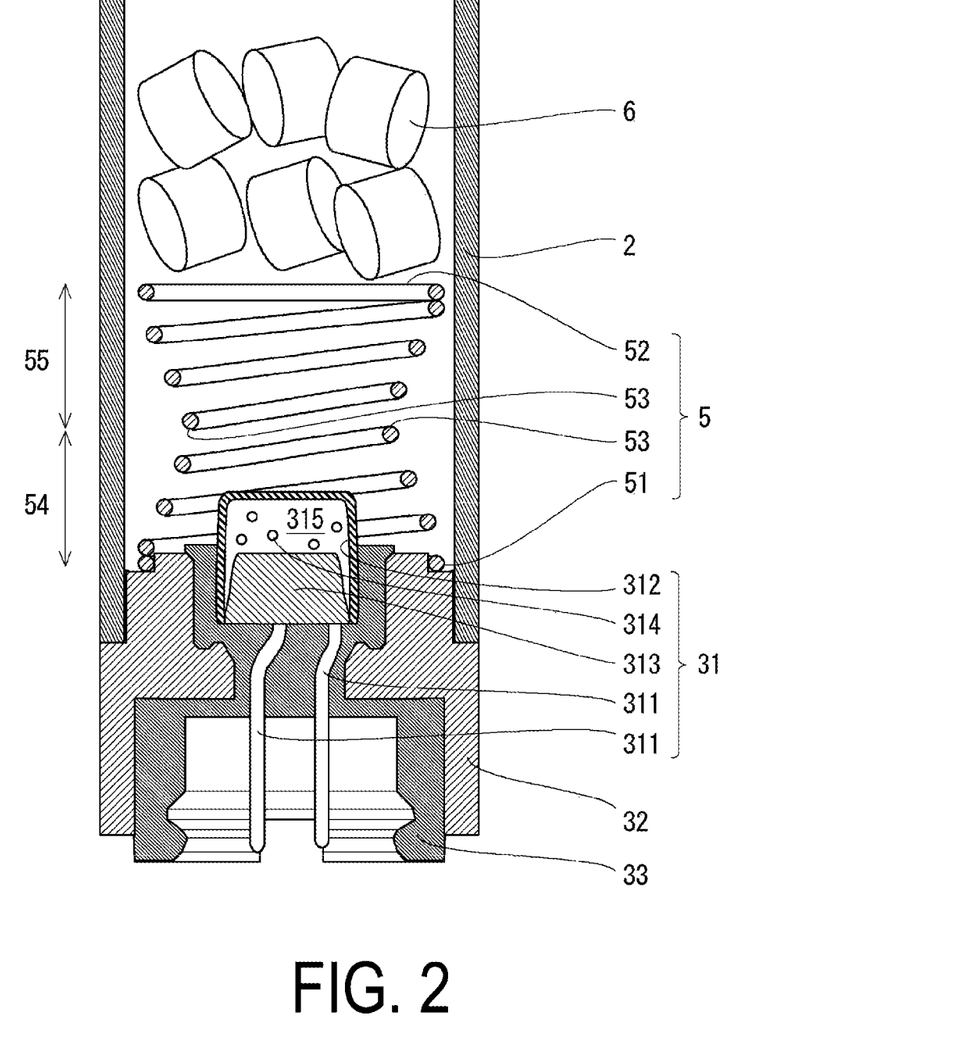
FIG. 2 is a schematic cross-sectional view for describing a configuration of an igniter assembly and a periphery thereof.

FIG. 1 is a schematic axial cross-sectional view illustrating an example of a gas generator. FIG. 2 is a schematic cross-sectional view for describing a configuration of an igniter assembly and a periphery thereof. A gas generator 1 is a columnar device that combusts a gas generating agent accommodated inside and discharges combustion gas to the outside, and can be used for inflating an airbag, for example. The gas generator 1 of FIG. 1 includes a housing 2 having a tubular shape, an igniter assembly 3 attached to one axial end side of the housing 2, and a diffuser portion 4 formed on the other end side of the housing 2.

The igniter assembly 3 is a device that ignites with an ignition current, and is used in an existing gas generator. For example, the igniter assembly 3 includes an igniter body 31 that ignites upon receiving supply of a current from the outside, a collar portion 32 made of metal, and a holding portion 33 made of resin fixing the igniter body 31 to the collar portion 32. The collar portion 32 is a metal member formed in a tubular shape. The collar portion 32 is attached to an opening on one axial end side of the housing 2 by, for example, full circumference welding. The collar portion 32 holds the igniter body 31 inside thereof via the holding portion 33. The holding portion 33 is interposed between the igniter body 31 and the collar portion 32 by injection molding, and fixes the igniter body 31 with respect to the collar portion 32. It should be noted that in order to suppress a circumferential rotation of the igniter body 31 and the collar portion 32, an inner peripheral surface of the collar portion 32 in touch with the holding portion 33 may be provided with recesses and protrusions.

Figure 3:
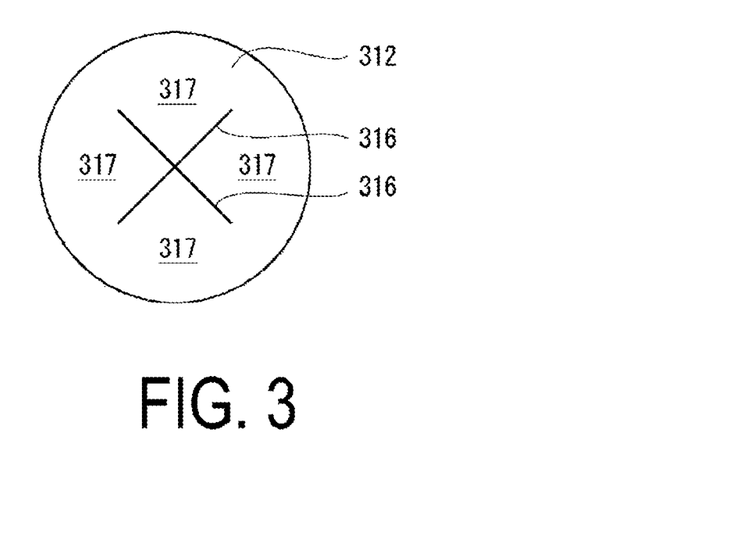
FIG. 3 is a schematic view of an upper surface of a cup body as viewed in an axial direction of a housing from the housing side.

The igniter body 31 includes a pair of electro-conductive pins 311, a cup body (igniter cup) 312 having a bottomed tubular shape whose one end is open, a sealing member 313 closing an opening of the cup body 312, and an ignition charge 314 accommodated in an ignition chamber 315, which is a space formed by the cup body 312 and the sealing member 313. The pair of electro-conductive pins 311 are connected via a bridge wire (not illustrated) in the ignition chamber 315. When the electro-conductive pins 311 are supplied with a current from the outside, the bridge wire, which is a resistor, generates heat to combust the ignition charge 314. It should be noted that the ignition charge 314 is used in an existing gas generator. The cup body 312 is a member made of metal in which, for example, resin insulating layers are stacked. The sealing member 313 is also made of metal, for example, and is insulated from one of the electro-conductive pins 311. The cup body 312 has a radial notch on a surface on the housing 2 side (called an "upper surface" for convenience). FIG. 3 is a schematic view of the upper surface of the cup body 312 as viewed in the axial direction of the housing 2 from the housing 2 side. On the upper surface of the cup body 312, two notches 316 crossing substantially at the center of the upper surface are formed in a cross shape. The notch 316 guides a position where the cup body 312 fractures during the operation of the igniter body 31. During the operation of the igniter body 31, an expansion expected part (in other words, the "expansion expected part" before operation) 317 whose peripheral edge is partially defined by the notch 316 expands on a gas generating agent 6 side accommodated in the housing 2. It should be noted that three or more notches 316 may be formed to cross at one point, or one expansion expected part provided on the upper surface of the cup body 312 may be open in a side open manner. When the ignition charge 314 in the ignition chamber 315 combusts, the cup body 312 is ruptured with an intersection point of the notches 316 as a starting point, for example, and a combustion product such as flame and combustion gas are released into the housing 2.

The housing 2 is, for example, a tubular member having a substantially uniform inner diameter and outer diameter, and forms an outer shell container of the gas generator 1. The material of the housing 2 is, for example, metal. Inside the housing 2, a combustion chamber 21 is formed between the igniter assembly 3 and the diffuser portion 4. The combustion chamber 21 accommodates an elastic member 5 such as a coil spring having one end disposed adjacent to the igniter assembly 3, and the gas generating agent 6 accommodated on the other end side of the elastic member 5. The elastic member 5 has a tubular outer shape, and the axial direction of the elastic member 5 and the axial direction of the housing 2 are disposed as the same.

The elastic member 5 is, for example, a compression coil spring. One end part 51 of the elastic member 5 has a wire material molded in a circular shape (not illustrated) and is fitted to a side periphery of the igniter assembly 3. In the example of FIGS. 1 and 2, the one end part 51 of the elastic member 5 is fitted to the side periphery of the collar portion 32, but the one end part 51 may be disposed on the side of the holding portion 33 or the cup body 312 of the igniter body 31. The elastic member 5 may be fixed by welding or the like without being fitted to the side periphery of the igniter assembly 3.

Another end part 52 of the elastic member 5 may have a spiral shape in an axial view in which the elastic member 5 is viewed in the axial direction. In the other end part 52 having the spiral shape, the interval between the wire materials may have a size not to allow the gas generating agent 6 to pass therethrough. For example, the interval between the radially adjacent wire materials has a size smaller than the diameter and length of the gas generating agent such as about 1 mm to 2 mm. In this manner, the elastic member 5 can apply the gas generating agent 6 in a direction of the diffuser portion 4. Since movement of the gas generating agent 6 is limited inside the gas generator 1, it is possible to suppress generation of abnormal noise and crushing of the gas generator 1 due to shaking of the gas generating agent 6. It should be noted that in the other end part 52, a perforated member such as a punched metal, a plain-woven wire mesh, a tatami woven wire mesh, or the like may be disposed at an end of a coil spring or the like. Even in such an aspect, it is possible to hold the gas generating agent 6 in the housing 2 by giving the penetration part a size making it difficult for the gas generating agent 6 to pass therethrough. Also in this case, for example, the diameter or one side of the opening has a size of about 1 mm to 2 mm.

The elastic member 5 has, inside in the axial direction, a decreased diameter part 53 whose diameter is the smallest. The elastic member 5 has a decreased diameter region 54 whose diameter gradually decreases from the one end part 51 toward the decreased diameter part 53, and an increased diameter region 55 whose diameter gradually increases from the decreased diameter part 53 toward the other end part 52.

The gas generating agent 6 combusts to generate combustion gas. The gas generating agent 6 includes a known composition, for example, being formed of, for example, guanidine nitrate (41 wt. %), basic copper nitrate (49 wt. %), a binder, and additives. As an individual shape of the gas generating agent 6, for example, a pellet shape, a disk shape, a columnar shape, or a single-hole columnar shape having a through hole can be used. However, the gas generating agent 6 is not limited to those described above.

The diffuser portion 4 is a tubular portion formed integrally with the housing 2 and closing the other end side of the housing 2. As illustrated in FIG. 1, for example, the diffuser portion 4 is bottomed tubular and includes a side peripheral surface 41 and a closed end 42 on an opposite side to the combustion chamber 21. A partition wall 7 is disposed between the combustion chamber 21 and the diffuser portion 4. The partition wall 7 is fixed between two plastic work portions 43 whose diameters have decreased by crimping the housing 2, for example. The side peripheral surface 41 has a gas discharge port 44. The gas discharge port 44 is a through hole, and a plurality of the gas discharge ports 44 are provided along the circumferential direction of the side peripheral surface 41. It should be noted that the plurality of gas discharge ports 44 may be provided in the axial direction of the diffuser portion 4. The gas discharge port 44 is closed by a closing member (not illustrated) such as a seal tape. The closing member is ruptured when the internal pressure of the gas generator 1 is increased by the combustion gas.

A filter 45 having a tubular shape is accommodated inside the side peripheral surface 41, and the combustion gas discharged from the gas discharge port 44 passes through the filter 45. The filter 45 comes into contact with the plastic work portion 43 at the end part of the combustion chamber 21 side, for example, and is held between the plastic work portion 43 and the closed end 42. The filter 45 may be, for example, one in which a plain-knitted metal wire material is accommodated in a molding die and compression-molded into a cylindrical shape, and is provided with a through hole in the axial direction. The filter 45 may be formed into a columnar shape having a mesh by winding a metal wire material around a rod-shaped core material and thus forming a plurality of layers, and crossing the wire materials with each other. The filter 45 may be one in which a sheet-like perforated plate such as an expanded metal, a punched metal, a metallic lath, a plain-woven wire mesh, or a tatami woven wire mesh is wound up in a columnar shape, and provided with a through hole in the axial direction. When the combustion gas generated by the combustion of the gas generating agent 6 passes through the filter 45, the filter 45 functions as a cooling portion that cools the combustion gas, and filters the combustion gas by filtering combustion residues of the combustion gas.

The partition wall 7 is a disk-shaped member, for example, and closes between the diffuser portion 4 and the combustion chamber 21. In other words, the partition wall 7 is disposed in the housing 2 and defines a boundary between the combustion chamber 21 accommodating the gas generating agent 6 and the diffuser portion 4. The partition wall 7 may be ruptured by an increase in the internal pressure of the combustion chamber due to the combustion gas, or may include a through hole through which the combustion gas passes.

Operation

In a state where the gas generator 1 is assembled to, for example, an airbag of an automobile, a connector (not illustrated) is connected to the pair of electro-conductive pins 311, and power can be supplied to the igniter assembly 3. In this state, when a sensor (not illustrated) mounted on an automobile or the like detects an impact, the igniter assembly 3 is operated by an ignition current supplied to electro-conductive pins 311. The igniter assembly 3 combusts the ignition charge 314 in the cup body 312 and releases the combustion product to the outside of the cup body 312. The gas generating agent 6 in the combustion chamber 21 is ignited by flame or combustion gas that is a combustion product of the ignition charge 314. The gas generating agent 6 combusts to generate combustion gas or the like as a combustion product. When the internal pressure of the combustion chamber 21 increases, the partition wall 7 is ruptured, and the combustion gas passes through the filter 45 of the diffuser portion 4 and is discharged from the gas discharge port 44. Then, the discharged combustion gas inflates an airbag not illustrated, for example.

Figure 4:
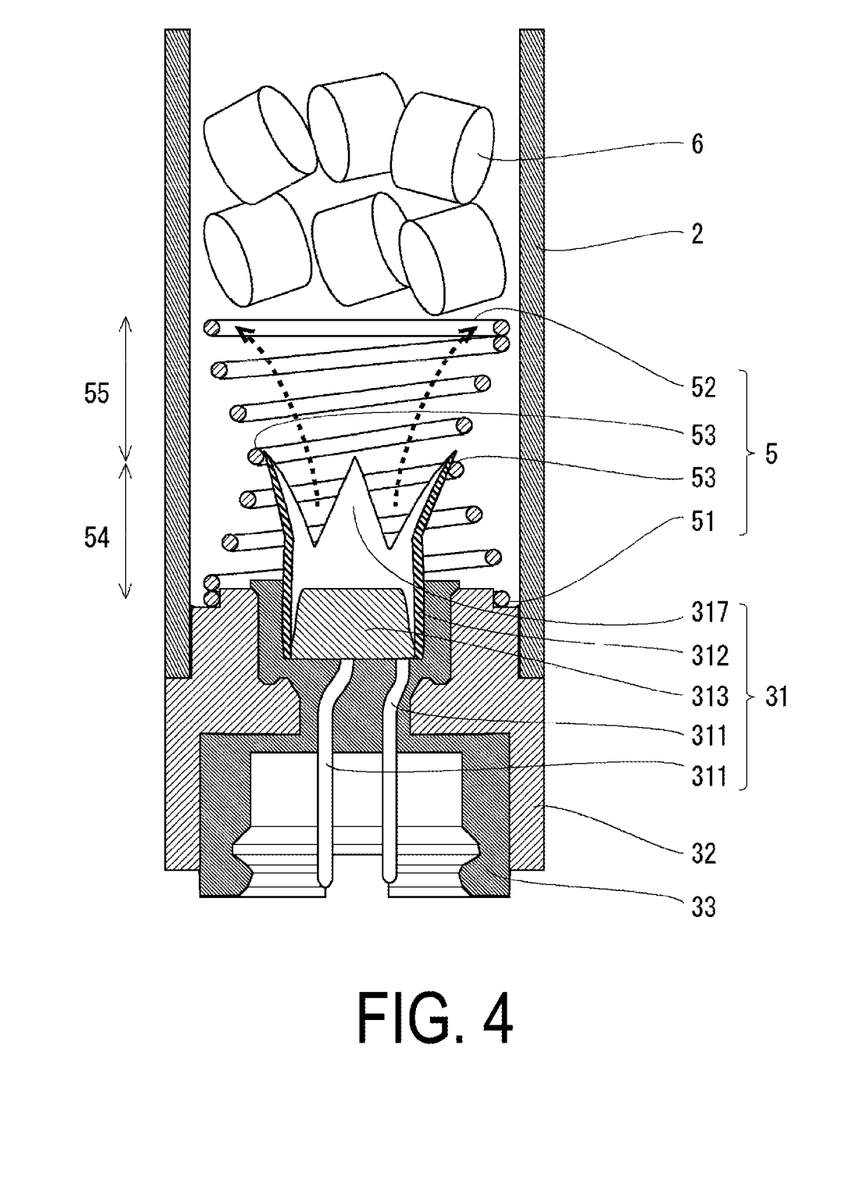
FIG. 4 is a schematic cross-sectional view of the igniter assembly and the periphery thereof illustrating an example of a state where an igniter body is operated.

FIG. 4 is a cross-sectional view of the igniter assembly and the periphery thereof, illustrating an example of a state where an igniter body is operated. In FIG. 4, the upper surface of the cup body 312 fractures along the notch 316, and the expansion part 317 is open toward the gas generating agent 6. At this time, the vicinity of the tip end of the expansion part 317 comes into contact with the decreased diameter part 53 of the elastic member 5, and the expansion angle of the expansion part 317 is limited. In other words, the decreased diameter part 53 is provided at a position in contact with the vicinity of the intersection point of the notch 316 (i.e., the most tip end part on the gas generating agent 6 side when the expansion part 317 expands) in the expansion expected part (the expansion part 317) before the operation of the igniter body 31 during the operation of the igniter body 31, and functions as a regulation portion that regulates the expansion of the expansion part 317 during the operation of the igniter body 31. It should be noted that not only the vicinity of the tip end of the expansion part 317 but also a part of the expansion part 317 and the decreased diameter part 53 are in contact with each other, whereby the expansion of the expansion part 317 can be regulated. In this case, a part of the expansion part 317 on the way to the tip end part touches the decreased diameter part 53, and the tip end part relative thereto touches and thus reaches the increased diameter region 55.

Effects

The direction in which the igniter body 31 releases the combustion product is limited by the angle of the expansion part 317 as indicated by the dashed arrow in FIG. 4, for example. That is, the decreased diameter part 53 suppresses the diffusion of the combustion product of the igniter body 31 in the direction of the inner wall of the housing 2, and the amount guided in the direction of the gas generating agent 6 held in the housing 2 increases. In general, when combustion products of the gas generating agent 6 are dispersed and released at a wide angle, some combustion products touch the housing 2 and are cooled. On the other hand, according to the present embodiment, the combustion product of the igniter body 31 suppresses the dispersion of a combustion product and more of them are guided toward the gas generating agent 6, and the ignition performance of the gas generating agent 6 is improved. In particular, the igniter body 31 and the combustion chamber 21 communicate with each other in a state before operation, and there is no obstacle to the expansion of the expansion part 317. Furthermore, the combustion product from the igniter body 31 can ignite the gas generating agent 6 evenly and efficiently. It should be noted that, the decreased diameter region 54 can also converge the moving direction of the combustion product from the igniter and supply it to the gas generating agent 6, and can increase the flow velocity of the combustion product to improve the ignitability of the gas generating agent 6. By adjusting the inclination angle of the increased diameter region 55 in advance, it is possible to release the combustion product to diffuse to the entire end part on the igniter assembly 3 side of the gas generating agent 6. In a case where a coil spring is used as the elastic member 5, if a plurality of coil springs are connected in the axial direction, the touch or the contact point between the end parts of the coil springs is shifted, an inclination occurs in the coil springs, and there is a risk of being difficult to transmit the combustion product to the combustion chamber 21 side. Use of one coil spring can cause the combustion product to be circulated as designed.

Figure 5:
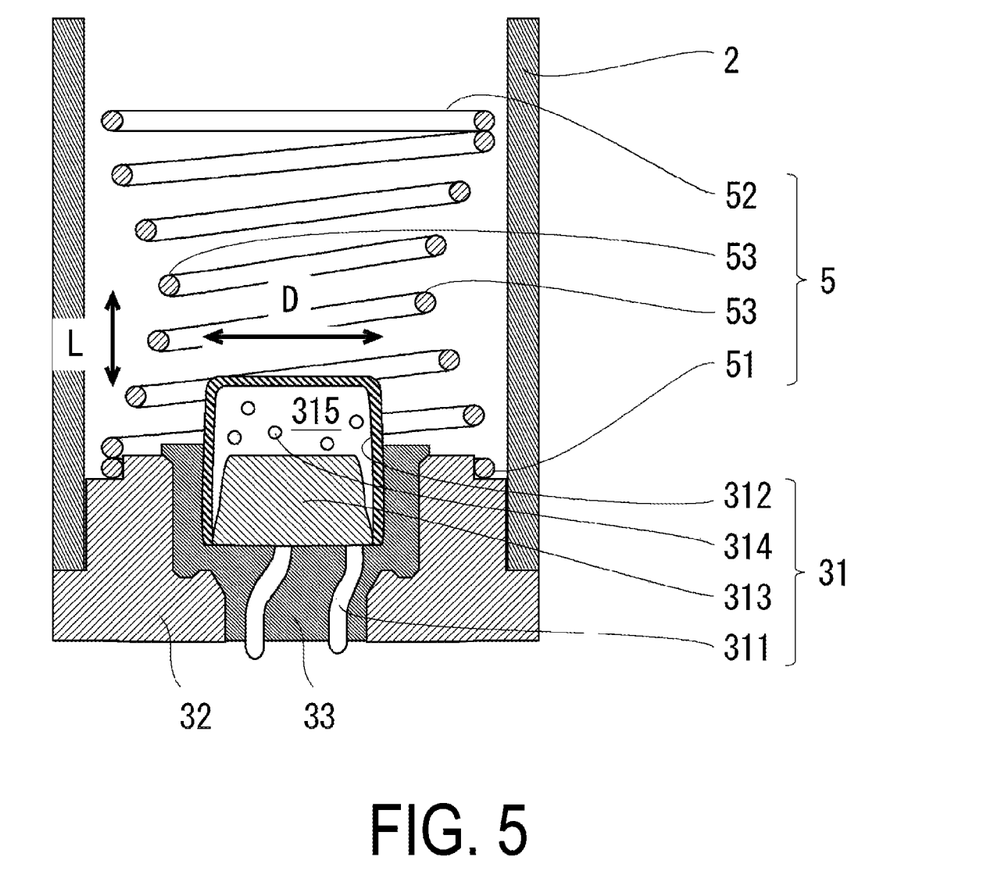
FIG. 5 is a view for describing a length from the igniter body to a decreased diameter part.

FIG. 5 is a view for describing the length from the igniter body to the decreased diameter part. As indicated by an arrow in FIG. 5, when the diameter of the upper surface of the cup body 312 is D, a length L from the upper surface of the cup body 312 to the decreased diameter part 53 can have a size generally represented by the following formula (1). It should be noted that the length L is a length from the upper surface of the cup body 312 to the decreased diameter part 53 in a state where the elastic member 5 is compressed in the axial direction thereof before operation of the gas generator 1.

$$D/2 \leq L \leq D \quad (1)$$

When the upper surface of the cup body 312 fractures along the notch 316 provided radially from the center thereof, the tip end of the expansion part 317 expands by drawing an arc of about the radius (D/2) of the cup body 312 in the direction of the diffuser portion 4 with the peripheral edge of the cup body 312 as a rotation axis. Therefore, the decreased diameter part 53 is preferably provided at a position of about D/2 from the cup body 312. When the entire upper surface of the cup body 312 fractures with a part of the peripheral edge left and expands in a side open manner, the tip end of the expansion part 317 expansion by drawing an arc of about the diameter (D) of the cup body 312 in the direction of the diffuser portion 4 with the part of the peripheral edge of the cup body 312 as a rotation axis. Therefore, the decreased diameter part 53 is preferably provided at a position of about D from the cup body 312. Therefore, the length L from the upper surface of the cup body 312 to the decreased diameter part is preferably set to be approximately equal to or greater than the radius of the cup body 312 and equal to or less than the diameter of the cup body 312 from the cup body 312.

It should be noted that the elastic member 5 may be formed with the increased diameter region 55 having a lower elastic modulus than the decreased diameter region 54. The elastic modulus can be made different by, for example, making a difference in the thickness or the number of turns of the coil spring. In this manner, in a state where the gas generator 1 is filled with the gas generating agent 6, even if there is a slight variation in the amount of the gas generating agent 6, the increased diameter region 55 is preferentially deformed, and the length of the decreased diameter region 54 becomes substantially constant. That is, the length from the igniter body 31 to the decreased diameter part 53 becomes substantially constant, and the tip end of the ruptured cup body 312 and the decreased diameter part 53 of the elastic member 5 come into contact with each other in a positional relationship designed in advance.

Modified Example

Figure 6:
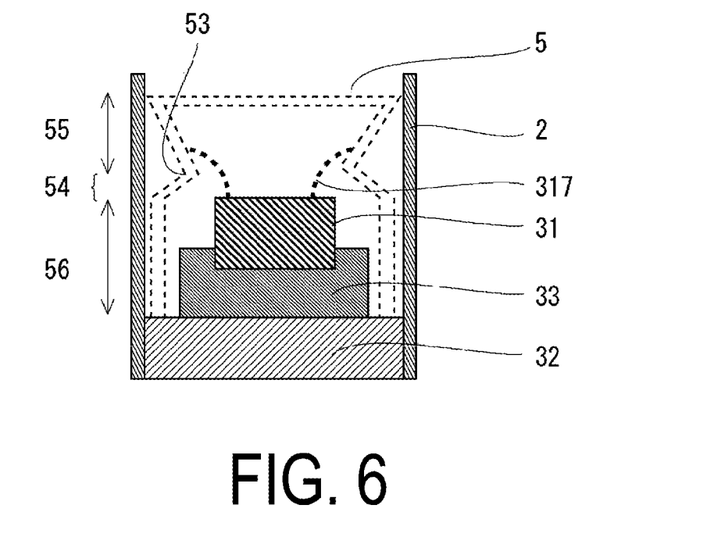
FIG. 6 is a schematic cross-sectional view of a periphery of an igniter assembly according to a first modified example.

FIG. 6 is a schematic cross-sectional view of the periphery of the igniter assembly according to the first modified example. In the modified example, members corresponding to those of the above-described embodiment are denoted by the same reference signs, and differences will be mainly described. A thin dashed line indicates the contour of a cross-sectional shape of the elastic member 5. A thick dashed line schematically indicates a cross-sectional shape of the expansion part 317 when ruptured. In the example of FIG. 6, the elastic member 5 is disposed on the side of the holding portion 33. It should be noted that the elastic member 5 may be fitted to the holding portion 33. The elastic member 5 has an equal diameter region 56 having a constant diameter on the igniter assembly 3 side. The elastic member 5 has the decreased diameter part 53 at a position in contact with the expansion expected part (the expansion part 317)

during operation of the igniter body 31, and has the decreased diameter region 54 whose diameter gradually decreases from the vicinity of the upper surface of the cup body 312 toward the decreased diameter part 53 and the increased diameter region 55 whose diameter gradually increases from the decreased diameter part 53 toward the diffuser portion 4.

Figure 7:
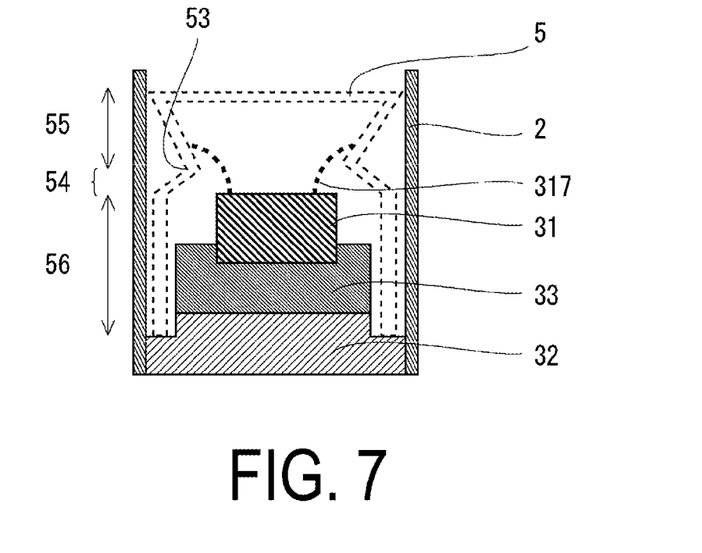
FIG. 7 is a schematic cross-sectional view of a periphery of an igniter assembly according to a second modified example.

FIG. 7 is a schematic cross-sectional view of the periphery of the igniter assembly according to the second modified example. In the example of FIG. 7, a part of the side surface of the collar portion 32 includes a part formed to be flush with the side surface of the holding portion 33. The elastic member 5 is disposed on the side of the collar portion 32 and the holding portion 33. It should be noted that the elastic member 5 may be fitted to the collar portion 32 and the holding portion 33. Also in the present modified example, the elastic member 5 has the equal diameter region 56 having a constant diameter on the igniter assembly 3 side. The elastic member 5 has the decreased diameter part 53 at a position in contact with the expansion expected part (the expansion part 317) during operation of the igniter body 31, and has the decreased diameter region 54 whose diameter gradually decreases from the vicinity of the upper surface of the cup body 312 toward the decreased diameter part 53 and the increased diameter region 55 whose diameter gradually increases from the decreased diameter part 53 toward the diffuser portion 4.

Figure 8:
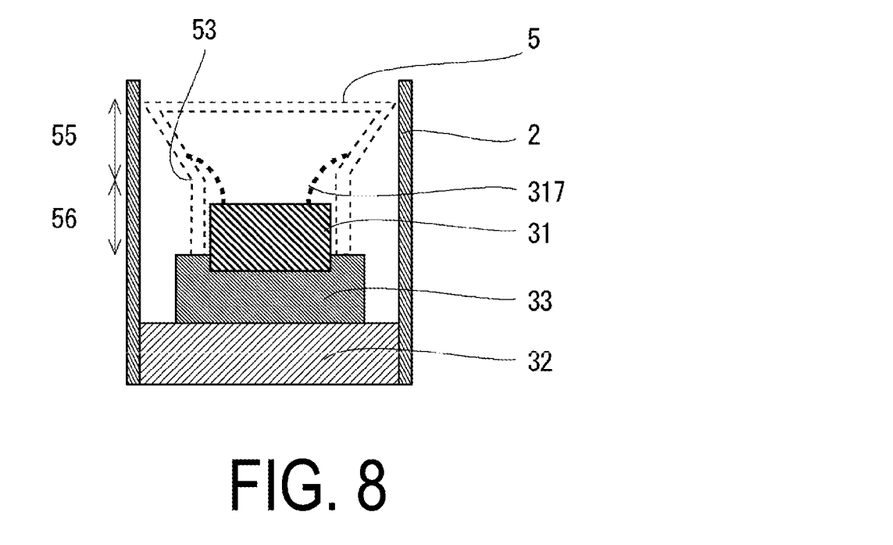
FIG. 8 is a schematic cross-sectional view of a periphery of an igniter assembly according to a third modified example.

FIG. 8 is a schematic cross-sectional view of the periphery of the igniter assembly according to the third modified example. In the example of FIG. 8, the elastic member 5 is disposed on the side of the cup body 312. It should be noted that the elastic member 5 may be fitted to the cup body 312. However, in order to avoid destruction of an insulating layer such as an insulating sheet formed on the surface of the cup body 312, it is preferable to provide a gap between the elastic member 5 and the cup body 312. The elastic member 5 has the equal diameter region 56 having a constant diameter on the igniter assembly 3 side. The elastic member 5 does not have the decreased diameter region 54. That is, the elastic member 5 has the increased diameter region 55 whose diameter gradually increases toward the gas generating agent 6 side at the end part on the diffuser portion 4 side of the equal diameter region 56. During the operation of the igniter body 31, the vicinity of the tip end of the expansion expected part (the expansion part 317) is in contact with the increased diameter region 55.

Figure 9:
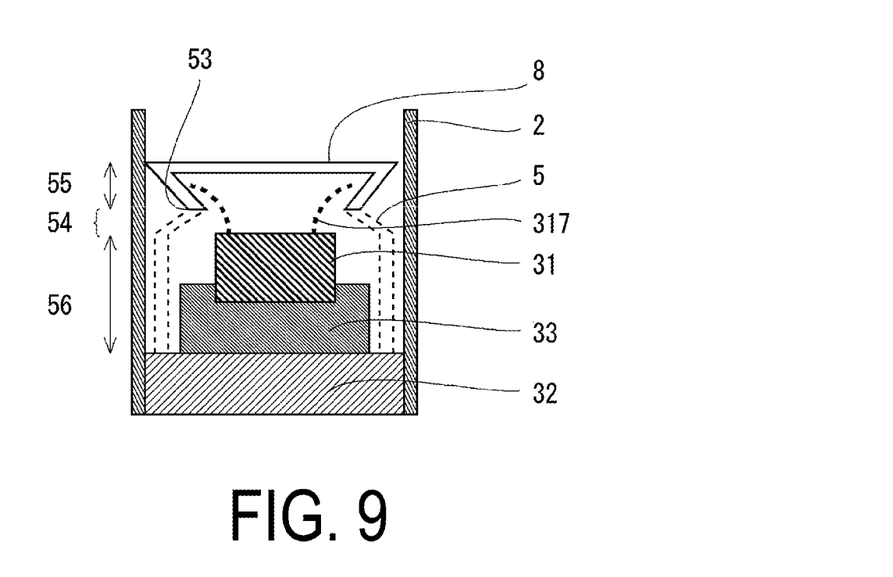
FIG. 9 is a schematic cross-sectional view of a periphery of an igniter assembly according to a fourth modified example.

FIG. 9 is a schematic cross-sectional view of the periphery of the igniter assembly according to the fourth modified example. In the example of FIG. 9, the elastic member 5 is disposed on the side of the holding portion 33. It should be noted that the elastic member 5 may be fitted to the holding portion 33. The elastic member 5 has the equal diameter region 56 having a constant diameter on the igniter assembly 3 side. The elastic member 5 has the decreased diameter part 53 at a position in contact with the expansion expected part (the expansion part 317) during operation of the igniter body 31, and has the decreased diameter region 54 whose diameter gradually decreases from the vicinity of the upper surface of the cup body 312. In the present modified example, the increased diameter region 55 is also a coil spring, but a perforated member 8 is disposed on the tip end surface (the other end part 52) thereof. The perforated member 8 may be a member not having elasticity, and is formed of, for example, a punched metal or a wire mesh.

Figure 10:
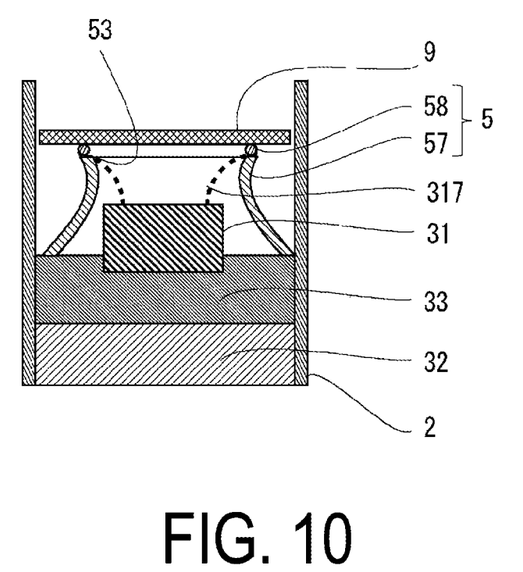
FIG. 10 is a schematic cross-sectional view of a periphery of an igniter assembly according to a fifth modified example.

FIG. 10 is a schematic cross-sectional view of the periphery of the igniter assembly according to the fifth modified example. In the example of FIG. 10, the elastic member 5 is disposed on the side of the igniter body 31. It should be noted that the elastic member 5 includes, for example, one in which three or more leaf springs 57 in the circumferential direction and an annular member 58 disposed along the inner periphery of the housing 2 and connected to the leaf springs 57 are integrally formed. A perforated member 9 such as a wire mesh is connected to the diffuser portion 4 side of the annular member 58. The perforated member 9 has a circular shape in a transverse cross-sectional view (not illustrated) of the housing 2, and the roughness of the mesh is set not to allow the gas generating agent 6 to pass therethrough. In the present modified example, the expansion expected part (the expansion part 317) and the annular member 58 may be in contact with each other during operation of the igniter body 31.

Other

Each aspect disclosed in the present specification can be combined with any other feature disclosed herein. The regulation portion needs not be a part whose diameter is the smallest in the elastic member 5 as long as the regulation portion comes into contact with the ruptured cup body 312. The diameter of the elastic member 5 may be constant over the entire length in the axial direction as long as the elastic member 5 includes a regulation portion regulating the direction in which the ruptured cup body 312 expands.

As illustrated in FIG. 3 of JP 2002-79903 A, for example, the igniter body 31 may include a metal charge holder surrounding the ignition charge from the side (radially outside of the housing 2) on the sealing member 313 (on the combustion chamber 21 side).

As illustrated in the embodiment and the modified example, it is preferable that one elastic member 5 is disposed between the igniter assembly 3 and the combustion chamber 21. When the other end part 52 of the elastic member 5 has a spiral shape, an interval part between the radially adjacent wire materials becomes a penetration part (i.e., a gap). At this time, it is preferable that the space formed inside the elastic member 5 and in which the igniter body 31 is disposed and the space in which the gas generating agent 6 is disposed in the combustion chamber 21 communicate with each other via the penetration part even in a state before operation of the gas generator 1. That is, since the igniter body 31 and the gas generating agent 6 communicate with each other before the operation of the gas generator 1, the combustion product from the ignition charge 314 easily reaches the gas generating agent 6. Therefore, the ignition performance and combustion performance of the gas generating agent 6 are improved.

The other end part 52 of the spiral shape may have a shape in which the radial center part protrudes on the combustion chamber 21 side or on the igniter body 31 side. The cross-sectional shape may be an annular slope or a curved slope from the protruding center part to the peripheral edge of the other end part 52. In this manner, the ignition surface of the gas generating agent 6 facing the igniter body 31 can be widened, and the ignition performance can be improved. It should be noted that a known transfer charge may be disposed between the igniter body 31 and the gas generating agent 6. Also by doing so, it is possible to improve the ignition performance and combustion performance of the gas generating agent 6. For example, by causing the radial center part of the other end part 52 of the elastic member 5 to protrude on the igniter body 31 side, the transfer charge may be disposed in a recess recessed on the combustion chamber 21 side. It should be noted that the part protruding to the combustion chamber 21 side or the igniter body 31 side is not limited to the radial center part, and a plurality of parts may protrude. The partially protruding other end part 52 does not need to have a spiral shape, and may be formed of a perforated member such as an expanded metal, a punched metal, a metallic lath, a plain-woven wire mesh, or a tatami woven wire mesh, and may be used in combination with a coil spring.

In the elastic member 5, which is a coil spring, the distance between the axially adjacent wire materials in the increased diameter region 55 may be shorter than the distance between the axially adjacent wire materials in the decreased diameter region 54. That is, the wire material interval in the increased diameter region 55 is made denser than that in the decreased diameter region 54 where the cup body 312 (the expansion part 317) ruptured during the operation of the igniter body 31 faces, and the combustion product can be suppressed from being discharged around the elastic member 5.

REFERENCE SIGNS LIST

1 Gas generator
2 Housing
21 Combustion chamber
3 Igniter assembly
31 Igniter body
311 Electro-conductive pin
312 Cup body
313 Sealing member
314 Ignition charge
315 Ignition chamber
316 Notch
317 Expansion part
32 Collar portion
33 Holding portion
4 Diffuser portion
41 Side peripheral surface
42 Closed end
43 Plastic work portion
44 Gas discharge port
45 Filter
5 Elastic member
51 One end part
52 Other end part
53 Decreased diameter part
54 Decreased diameter region
55 Increased diameter region
56 Equal diameter region
57 Leaf spring
58 Annular member
6 Gas generating agent
7 Partition wall
8 Perforated member
9 Perforated member

The invention claimed is:

1. A gas generator, comprising:
an igniter assembly configured to release a combustion product and including,
an igniter body accommodating an ignition charge, the igniter body including an igniter cup ruptured by the combustion product generated by combustion of the ignition charge and an electro-conductive pin that supplies a current for igniting the ignition charge,
a collar portion holding the igniter body, and
a holding portion interposed between the igniter body and the collar portion and configured to fix the igniter body to the collar portion;
a housing having a tubular shape, the housing including a combustion chamber accommodating a gas generating agent to be ignited by the combustion product, and including a gas discharge port through which a combustion gas generated by combustion of the gas generating agent is discharged; and
a spring having a tubular shape, the spring being disposed between the igniter assembly and the gas generating agent in the housing with an axial direction of the spring being in a same direction as an axial direction of the housing, the spring including a regulation portion that has a smallest diameter at an inner periphery thereof, the regulation portion being configured to restrict movement of a ruptured portion of the igniter cup, wherein
the igniter cup includes an expansion expected part formed in a rupture surface facing the combustion chamber, the expansion expected part including a peripheral edge, a part of which is defined by a notch guiding a position of the igniter cup to be fractured, the expansion expected part being configured to expand in a state where another part of the peripheral edge is connected to the igniter cup at a time of combustion of the ignition charge, and
the regulation portion is provided at a position in contact with the expansion expected part that expands.

2. The gas generator according to claim 1, wherein the regulation portion is a decreased diameter part where an inner diameter of the spring is smallest.

3. The gas generator according to claim 2, wherein the spring decreases in diameter from a side of the igniter assembly toward the decreased diameter part.

4. The gas generator according to claim 2, wherein the spring increases in diameter from the decreased diameter part toward a side of the gas generating agent.

5. The gas generator according to claim 1, wherein a side of the igniter assembly in the spring is fitted to the collar portion or the holding portion.

6. The gas generator according to claim 1, wherein the spring has a lower elastic modulus on a side of the gas generating agent than on a side of the igniter assembly with respect to the regulation portion as a reference.

7. The gas generator according to claim 1, wherein the spring includes, at an end part on a side of the gas generating agent, a penetration part having a size that allows the combustion product to pass therethrough and does not allow the gas generating agent to pass therethrough, and applies force to the gas generating agent toward an opposite side of the igniter assembly.

8. The gas generator according to claim 1, wherein a single spring is disposed between the igniter assembly and the combustion chamber.

9. The gas generator according to claim 1, wherein an end part of the spring has a spiral shape, an interval part between the radially adjacent wire materials becomes a gap,
a space formed inside the spring and the combustion chamber communicate with each other via the gap before operation of the gas generator.

10. The gas generator according to claim 9, wherein the end part of the spring has a shape in which a radial center part of the end part protrudes on a side of the combustion chamber or on a side of the igniter body.

11. The gas generator according to claim 10, further comprising:
   a transfer charge provided in a recess that is formed in the radial center part of the spring so as to protrude in the side of the igniter body.

12. The gas generator according to claim 1, wherein
   the spring has an increased diameter region where a diameter of the spring increases from regulation portion toward the side of the gas generating agent, and
   a distance between axially adjacent wire materials in the increased diameter region is shorter than the distance between the axially adjacent wire materials in the regulation portion.

13. A gas generator, comprising:
   an igniter assembly including an igniter cup accommodating therein an ignition charge and being ruptured by a combustion product generated by combustion of the ignition charge such that an expansion part formed in an upper surface of the igniter cup is opened,
   a housing including a combustion chamber accommodating a gas generating agent and including a gas discharge port through which a combustion gas generated from the gas generating agent is discharged; and
   a coil spring having a tubular shape and disposed between the igniter assembly and the gas generating agent in the housing with an axial direction of the coil spring being in a same direction as an axial direction of the housing, the coil spring including,
      a first end opposing the igniter assembly,
      a second end opposing the gas generating agent, and
      a regulation portion having a smallest diameter in the coil spring and being provided between the first end and the second end, the regulation portion being configured to regulate an expansion direction of the expansion part such that a tip end of the expansion part comes into contact with the regulation portion.

14. The gas generator according to claim 13, wherein
   the coil spring increases in diameter from the regulation portion toward the first end and forms a decreased diameter region.

15. The gas generator according to claim 14, wherein
   the coil spring increases in diameter from the regulation portion toward the second end and forms an increased diameter region.

16. The gas generator according to claim 15 wherein
   the coil spring has a lower elastic modulus on a side of the increased diameter region than on a side of the decreased diameter region with respect to the regulation portion as a reference.

17. A gas generator, comprising:
   a housing including a combustion chamber and being provided with a gas discharge port;
   an igniter assembly provided within the housing and including a cup that accommodates therein an ignition charge and is ruptured in an expansion portion formed in a closed end of the cup by a combustion product of the ignition charge;
   a gas generating agent provided within a combustion chamber; and
   a single coil spring disposed between the igniter assembly and the gas generating agent in the housing with an axial direction of the single coil spring being in a same direction as an axial direction of the housing, the single coil spring including,
      a first end being in contact with the igniter assembly,
      a second end opposing the gas generating agent, and
      a regulation portion having a smaller diameter than the first end and the second end and being provided at a region between the first end and the second end, the regulation portion being configured to limit an expansion angle of the expansion portion by contacting to the expansion portion which comes into contact with the regulation portion.

18. The gas generator according to claim 17, wherein the second end of the single coil includes a spiral shape viewed in an axial direction such that an interval between a radially adjacent wire materials has a size smaller than the gas generating agent.

19. The gas generator according to claim 18, wherein the single coil spring further includes,
   a decreased diameter part whose diameter decrease from the first end toward the regulation portion, and
   an increased diameter part whose diameter increases from the regulation portion toward the second end,
   the regulation portion is provided at a position in contact with a tip of the expansion part.

* * * * *